(12) United States Patent
Witters

(10) Patent No.: US 9,966,763 B2
(45) Date of Patent: May 8, 2018

(54) INTEGRATED MULTIPLE FUEL RENEWABLE ENERGY SYSTEM

(75) Inventor: Allen L. Witters, Las Vegas, NM (US)

(73) Assignees: Allen L. Witters, Las Vegas, NM (US); Joel Scheinberg, Las Vegas, NM (US); Robert E. Lyon, Los Angeles, CA (US)

( * ) Notice: Subject to any disclaimer, the term of this patent is extended or adjusted under 35 U.S.C. 154(b) by 0 days. days.

(21) Appl. No.: 12/131,106

(22) Filed: Jun. 1, 2008

(65) Prior Publication Data

US 2008/0303348 A1    Dec. 11, 2008

Related U.S. Application Data

(60) Provisional application No. 60/942,522, filed on Jun. 7, 2007, provisional application No. 60/955,466, filed
(Continued)

(51) Int. Cl.
*H02J 3/46* (2006.01)
*H02J 3/38* (2006.01)

(52) U.S. Cl.
CPC ................ *H02J 3/46* (2013.01); *H02J 3/381* (2013.01); *H02J 3/382* (2013.01); *H02J 3/386* (2013.01);
(Continued)

(58) Field of Classification Search
CPC ....................................................... H02J 3/46
(Continued)

(56) References Cited

U.S. PATENT DOCUMENTS 5,210,685 A * 5/1993 Rosa .............................. 363/109
6,670,721 B2 * 12/2003 Lof et al. ........................ 290/44
(Continued)

OTHER PUBLICATIONS

PCT/US2008/065642, International Search Report by ISA/US, dated Jun. 18, 2009.
(Continued)

*Primary Examiner* — Rexford Barnie
*Assistant Examiner* — Joseph Inge
(74) *Attorney, Agent, or Firm* — Robert E. Lyon

(57) ABSTRACT

A system for continuously generating baseload electrical energy entirely from renewable resources and transmitting the generated electrical energy to a transmission grid includes, in combination, a first energy generation device for continuously generating electrical energy output, which has a bio-mass fuel supply requirement for generating the electrical energy. One or more additional energy generation devices provide, as available, intermittent electrical and thermal energy for substituting, or supplementing, the electrical energy output of the first energy generation device, and for supplementing the fuel supply requirement for the first energy generation device. A switching device ensures a least-cost generation of baseload electrical energy from the generating system by selectively using the output of the first energy generation device or, as available, the one or more additional energy generation device for substituting, or supplementing, the electrical output of the first energy generation device, and selectively supplementing the fuel supply requirement of the first energy generation device providing, at a minimum, a baseload electrical energy output exclusively from renewable energy resources. A redundant supply of combustible bio-mass fuel assets are assured by a bio-mass harvesting and logistics system which supplies such fuels directly from the source to the first energy generation device for combustion. Effluent gasses containing $CO_2$ from bio-mass combustion are sequestered in a body of fluid containing micro-algal bodies and light-emitting sources for causing, by photosynthesis in the presence of $CO_2$, an increased mass of algal bodies by absorption of the $CO_2$ and the emission of free oxygen. The increased mass of algal bodies are removed from the fluid body and used for the production of bio-diesel fuel. A method of operating an entirely renewable sourced electric power generation and transmission business is also provided.

25 Claims, 10 Drawing Sheets

Related U.S. Application Data on Aug. 13, 2007, provisional application No. 60/956,083, filed on Aug. 15, 2007.

(52) U.S. Cl.
CPC ............ *Y02E 10/763* (2013.01); *Y02P 80/21* (2015.11); *Y10T 307/658* (2015.04)

(58) Field of Classification Search
USPC .................................................... 307/72, 64
See application file for complete search history.

(56) References Cited

U.S. PATENT DOCUMENTS

| | | |
|---|---|---|
| 6,820,689 B2 | 11/2004 | Sarada |
| 7,078,825 B2 | 11/2006 | Ebrahim et al. |
| 7,369,921 B2 * | 5/2008 | Taliaferro .................... 700/286 |
| 7,714,463 B2 * | 5/2010 | Su et al. ......................... 307/80 |
| 2003/0122004 A1 | 7/2003 | Allen et al. |
| 2005/0165511 A1* | 7/2005 | Fairlie ........................... 700/286 |
| 2006/0192435 A1* | 8/2006 | Parmley ......................... 307/66 |
| 2007/0062194 A1 | 3/2007 | Ingersoll |
| 2007/0084208 A1* | 4/2007 | Goldman ........................ 60/698 |
| 2009/0076661 A1* | 3/2009 | Pearson et al. ............... 700/291 |

OTHER PUBLICATIONS

PCT/US2008/065642, Written Opinion of the ISA/US, dated Jun. 18, 2009.
PCT/US2008/065642, International Preliminary Report on Patentability by ISA/US, dated Dec. 7, 2009.

* cited by examiner

U.S Energy Information Administration 2005 Market Splits.

MARKET NEEDS- 4,095 BILLION KWh

Total= 4,055 Billion KWh

Electric Utility Plants=63.0%
Independent Power
Producers & Combined
Heat and Power Plants= 37.0%

PETROLEUM 3.0%
OTHER 0.1%
NATURAL GAS 18.7%
COAL 49.7%
OTHER RENEWABLES 2.3%
NUCLEAR 19.3%
OTHER GASSESNUCLEAR 0.4%
HYDROELECTRIC 6.5%

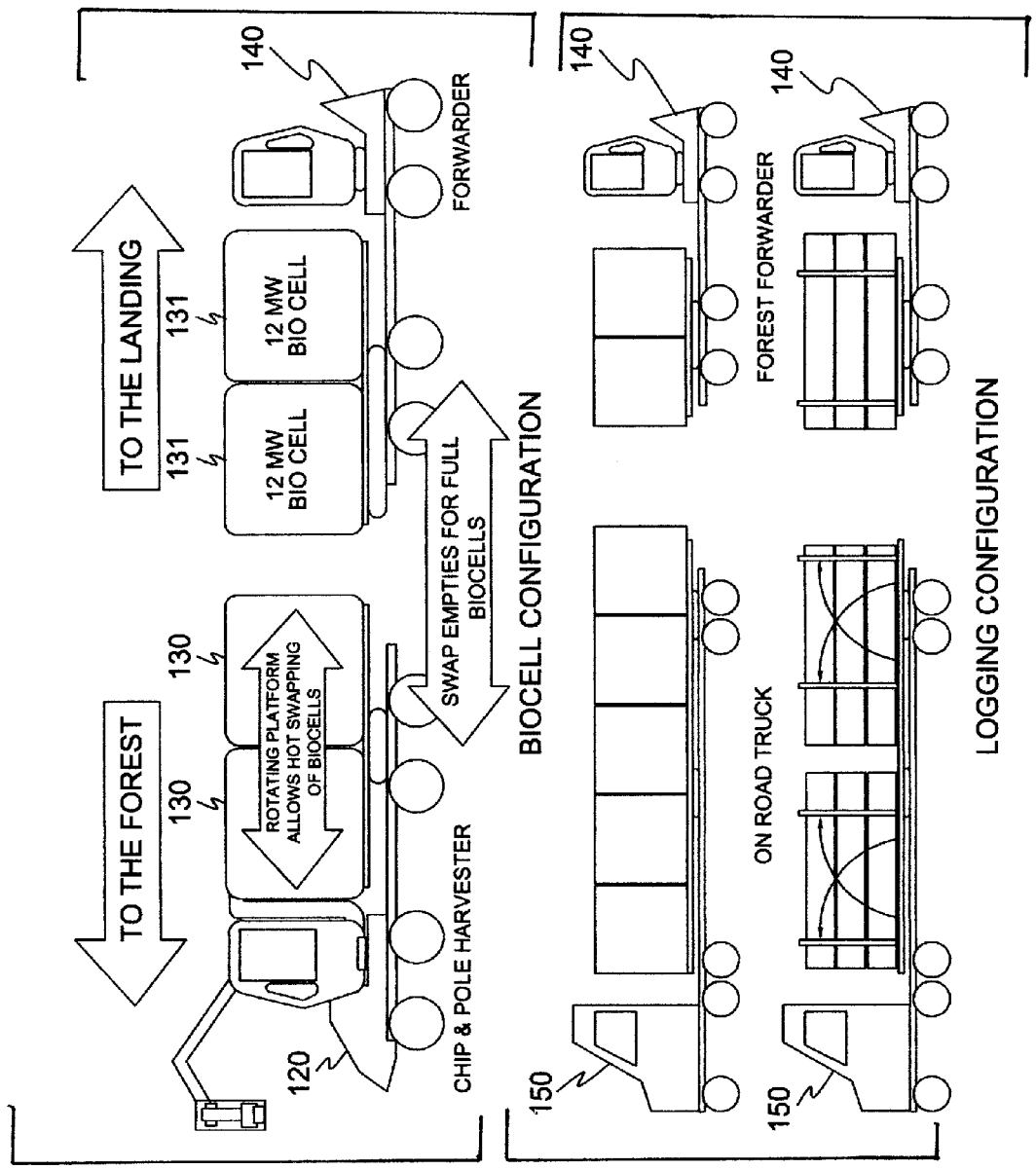

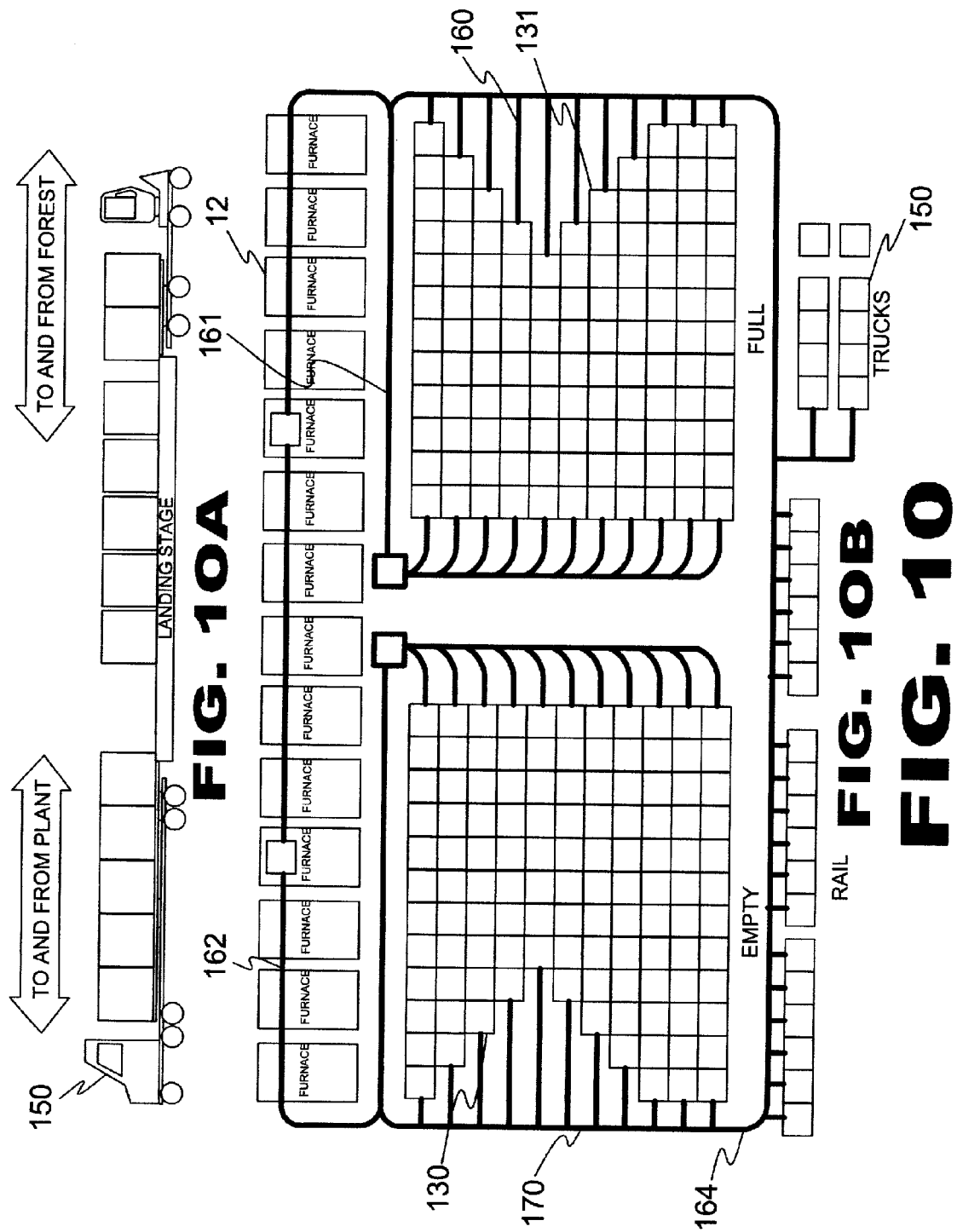

INTEGRATED MULTIPLE FUEL RENEWABLE ENERGY SYSTEM

CROSS-REFERENCE TO PROVISIONAL PATENT APPLICATIONS

Domestic priority is hereby claimed, pursuant to 35 U.S.C. § 119(e), from:
1. U.S. Provisional Patent Application Ser. No. 60/942,522, filed Jun. 7, 2007;
2. U.S. Provisional Patent Application Ser. No. 60/955,466, filed Aug. 13, 2007; and,
3. U.S. Provisional Patent Application Ser. No. 60/956,083, filed Aug. 15, 2007,
the entire disclosure of each of the foregoing three provisional patent applications shall be deemed to be incorporated by reference herein.

BACKGROUND OF THE INVENTION

Technical Field of the Invention

The present invention relates, generally, to integrated facilities and related methods for the production of electrical energy from non-fossil fuels using entirely renewable resources on a sustainable basis at acceptable market prices.

Description of the Prior Art

The electricity market in the United States for the year 2005 exceeded 4 trillion kilowatt hours representing revenues exceeding $300 billion (US.) A substantial majority of that electricity is generated using fossil fuels as the initial source of energy. Coal alone amounts to almost 50% of the energy source, natural gas provides almost another 19% and nuclear energy, also about 19%. Energy from hydroelectric sources is approximately 6.5% and petroleum amounts to about 3%. The contribution from renewable resources amounts to somewhere between 2.5 and 3%. According to industry sources, electricity consumption is expected to increase by more than 50% by 2025. Hence, assuming no changes in the current sources of energy are implemented, development must be greatly expanded to meet these demands. There are serious problems, however, in expanding the use of existing forms of energy. While the world's supply of coal may seem adequate for the time being, both political and environmental pressures will reduce the use of coal as it is one of the largest of contributors to greenhouse gas emissions. Natural gas, as an alternative, also produces oxides of carbon and other pollutants. Nuclear systems are generally unpopular, feared as unsafe by many, and plants are exceedingly expensive to build. The problem of disposal of nuclear waste has only been partially solved. Finally, there has been an historical decline in the utilization of hydroelectric power, as additional potential sites are not available and cost-benefit ratios of dams are not favorable. Older coal plants are expected to be decommissioned because of pollution issues. Replacement power must be found that is clean, as well as developing additional capacity to meet demand.

As of this writing, several states in the United States have legislated renewable portfolio standards (RPS) which mandate an average of 20 to 25% of all electricity consumed to be generated from renewable resources. Hence, increased energy usage, environmental desires and government regulations will drive the electric industry for the development of feasible and sustainable energy generated using renewable resources in sufficient quantities to meet demand.

The principal existing technologies, which employ renewable resources, include wind generation, solar (photovoltaic and thermal), geothermal, and bio-mass. Each of these technologies (with the possible exception of bio-mass), as implemented or contemplated today cannot provide reliable baseload energy, in that these technologies do not provide electric energy on a constant and predictable basis. The transmission and delivery of electrical energy is dependent, or has become dependent, upon reliable continuous sources of energy to provide predictability. It has become a problem how to integrate power from intermittent resources, such as wind and solar, into an unpredictable demand for energy. Other problems with renewable energy have included the high cost of renewable energy, due to expensive technology to produce it. Underdeveloped and oversubscribed transmission systems have exacerbated the problem of delivering intermittent renewable energy as 100% capacity must be reserved on transmission lines if the full output of these resources is to be available regardless of utilization. Alternate fossil fuel capacity must be built to augment or fulfill requirements should the renewable resources be impaired by weather or time of day. Other problems with renewable resources have included inadequate fuel management and control of inventory of bio-mass fueled resources.

SUMMARY OF THE INVENTION

It is, therefore, an object of the present invention to provide power generating methods and facilities for producing electrical energy on a continuous (non-intermittent) basis, using only renewable resources.

It is a further object of the present invention to provide a process for generating electrical energy from wind generation, solar thermal and bio-mass in an integrated facility by employing appropriate controls and methods, such that power can be dispatched on a "just-in-time" basis from the lowest cost energy source.

It is also an object of the present invention to provide fully scalable renewable energy capacity by employing, in addition to wind and solar, the combustion of bio-mass on a continuously regulated basis.

It is, yet, a further object of the present invention to provide fully scalable renewable energy capacity employing wind and solar in combination with the combustion of bio-mass on a continuously regulated basis, while also eliminating the emission of greenhouse gases.

It is still a further object of the present invention to obtain the advantage of allowing for the replacement of carbon-based sources of energy, such as petroleum, coal and other fossil fuels, by way of the provision of new sources of energy to meet growing demand, while at the same time reducing the overall consumption of fossil fuels and a reduction of the emission of greenhouse gases.

The foregoing and related objects and advantages are accomplished by the present invention, which provides for the creation of a power generating plant employing wind driven generators connected system-wise with solar thermal devices and steam generators fueled by bio-mass burners. By appropriate controls, such a power plant can seamlessly and instantaneously switch between bio-mass, solar thermal and wind fuels to provide 100% availability of electric power 24 hours/day, seven days/week. This solution aggregates the variable power from the primary three independent power sources to provide a reliable consistent output for maximizing utilization of the transmission system. For a utility power provider company, such a plan would be viewed as a pure capacity, wholesale supplier.

The present invention contemplates that generation plants be located in areas of abundant and recurring renewable sources, such as near forest product sites or bovine manure. To this availability aspect, the inventive system for continuously generating baseload electrical energy from renewable resources is further enhanced by designed redundancy in production systems and controls that ensure continuous operation and seamless dispatch of electrical generation. The design and operation of this plant allows the operator to select the predominant and least-cost fuel source at any one time at a cost competitive to any conventional coal or gas-fired plant. The plurality of energy generation means provides considerable redundancy to enhance reliability, ease maintenance and reduce risk of lost delivery. Furthermore, the system of the present invention provides the ability to deliver, in excess of baseload requirements, more energy when demand conditions exist by employing peak combinations of all three renewable energy sources.

The basic energy source will be steam-powered generator systems. The steam/water system will be closed-cycle, so as to reduce water consumption beyond the initial charge, while water losses inherent in such a system can be replenished from other sources within the overall system, such as from the dehydration of harvested bio-mass. Solar power in the form of "solar thermal" will be ideally utilized as a substitute for, or adjunct to, heat supplied by the combustion of bio-mass. While solar thermal can alternatively be integrated into the transmission grid by the utilization of various conventional power blocks, there are, however, more efficient ways of using solar power and, accordingly, the preferred embodiment of the present invention favors the utilization of solar thermal energy as a "pre-heat" source for the steam generation system.

Windmill powered generators typically are connected directly to the transmission grid, as windmill generators are conventionally configured to supply power in Alternating Current at 50 or 60 Hz; various manufacturers provide different output voltage options, 690 VAC being common. One of the shortcomings of windmill generators is that they are sensitive to wind conditions in several ways. As a major example, many windmills can only operate within a window of speed, generally, at a "cut-in" speed above 5 mph and a "cut-off" speed of about 55 mph. Rated or nominal output is at about 25 mph. At above the cut-off wind speed, windmills are typically tethered and taken out of service to prevent damage to the equipment. Below 5 mph wind speed, windmill generators continue to generate electric power, but their power output is not acceptable to the power grid, either because the frequency of the AC has dropped, the phase has fallen out of sync or because the voltage level has simply dropped. The present invention is not solely dependent upon always coupling the output of wind generators directly to the grid. Rather, output from wind generators that has become less than optimal will be conducted to electrically resistive elements in the steam boilers to augment production of heat therein. Thereby, the entire output of wind generators can be optimized.

Similarly, solar thermal systems, if coupled through power blocks to the grid, have optimal, and less than optimal, periods of power production. Those solar thermal systems which convert solar energy into electricity do not optimize the totality of sunlight to which they are exposed, such as during sunrise and sunset, or during overcast or cloudy days, however, solar thermal energy therefrom is still available. If it were decided to configure the system of the present invention to convert solar to electricity through a power block, it would be feasible to utilize some of the non-optimal solar heat as an adjunct to boiler pre-heat in the steam generation system in a manner similar to that for non-optimal windmill power; the maximum utilization of solar thermal can thereby be realized.

In the preferred embodiment of the present invention, forest waste and thinnings provide the primary source of bio-mass. Historical analysis shows that in western forests in the United States less than 50% of harvested wood is prime material of value for such as "dimensional lumber" (what will be referred to herein as "optimal" versus "sub-optimal" forestry assets.) In most regions in the southwestern part of the United States, the wood resources contain very little dimensional lumber and most is of "small diameter" with limited commercial value. These are considered "sub-optimal forestry assets." Moreover, these forests must be thinned to reduce the threat of catastrophic fire and improve water yields. There are also other forest-like growths of plants which, beyond providing ground cover, have no commercial use, such as, for example, juniper, which only acts to use up ground water which could be better used elsewhere in the forest. It therefore makes sense to use such sub-optimal plants as "forest waste"-bio-mass. Some analyses estimate that as much as 70% of a harvested forest may be considered waste material. An important feature of the present invention is the ability to use all of the material from harvesting and thinning operations by conversion into chip form in the field while extracting designated prime lumber. This not only provides the ability to use all of the material harvested from the forest, but regular thinning is known to enhance the growth of prime or optimal timber. Hence, sound forestry stewardship through thinning and collection of "waste materials" not only provides an enhanced source of bio-mass, but at the same time, augments the growth and production of prime timber.

Bovine manure, the disposal of which has become problematic in many parts of the United States, is contemplated as an ideal alternate source of bio-mass fuel. Dairies and feedlots face a significant problem of waste disposal and have issues with ground water pollution. The present invention remedies these issues and utilizes bovine bio-mass waste material to provide renewable energy, with other potential benefits described later.

As briefly mentioned, heretofore, it is an important feature of the present invention to locate power plants near places having an abundant supply of the bio-mass to be utilized. One of the more common problems of prior bio-mass generation systems has been a failure to plan for, and secure, adequate redundancy of sources and to provide sufficient inventory controls to assure a reliable supply of bio-mass fuel under all conditions. In addition to location and access, the present invention obviates the redundancy and inventory problems by providing a comprehensive logistics system to harvest, transport, inventory and manage fuel. In a preferred embodiment, a logistics system is provided which is equally adaptable to wood chips and other forestry products or to cow manure.

In the case of the use of forestry products, the logistics system begins at the point of harvest using a harvester-chipper-container-bio-cell combination that is at the heart of the fuel logistics system. This system includes an automated fuel gathering system, which comprises a chip-and-pole harvester, which is highly effective in thinning forestry areas and for gathering the material left on the forest floor from harvesting prime timber, as well as for gathering other forestry wastes such as damaged or infected growths, fallen limbs and the like. The harvester cuts the sub-optimal forestry assets, gathers the material, including forestry waste, as available, and delivers it into a chipper which then delivers the chippings into specially designed containers before leaving the forestry site. A suitable set of equipment for these purposes is manufactured by Komatsu Forest LLC under their VALMET-brand line. Harvester Models 941 and 911 are well suited to thinning and forest waste collection. VALMET Model 890, fitted with an "in woods" chipper device adapted to feed the disclosed bio-cell containers would serve well to complete the chipping and forestry waste forwarding operations. "Containers," herein also referred to as "bio-cells" or "bio-cell containers," are highly efficient and effective for storing, transporting and assisting in the conversion of bio-mass to the fuel used to generate heat for the steam boilers. The bio-cell containers, once filled, are shipped to the power plant via truck or rail, where they are loaded into an automated bio-mass fuel inventory and delivery system. This fuel logistics system provides essentially "zero handling" of the bio-mass materials from the point of harvest to the point of combustion. These bio-cells may also be fitted with appropriate heating and ventilating systems to form a vapor kiln to remove latent moisture from the bio-mass. The bio-cells may also be used to leach wood sugars for bio-gas or ethanol extraction. Furthermore, the closed bio-cell carriers eliminate flying debris during transport and storage.

Another important feature of the present invention deals with sequestration of the products of combustion of the bio-mass. The complete combustion of most wood products produces products-of-combustion consisting of, in addition to fly ash, gases, primarily comprising carbon dioxide and water vapor; some types of wood also produce traces of sulfur and nitrogen. It has been theorized that $CO_2$ from a fossil fuel combustion system and nutrients can be added to a photobioreactor where microalgae photosynthetically convert the $CO_2$ into compounds for high commercial values or mineralized carbon for sequestration.

Quite beneficially, the present invention can eliminate all atmospheric emissions of carbon gases. There are a variety of ways to remove carbon dioxide and other greenhouse gases from the "flue gases" of the furnaces that heat the boilers.

In one embodiment of the present invention, the flue gases would first be cooled with heat exchangers and those gases fed into algae ponds. Heat extracted by the exchangers can be recycled into the boiler furnaces. The introduction of concentrations of carbon dioxide augments the growth of algae. While there are many strains of algae, it is known that the blue-green and green strains optimally function by photosynthesis of $CO_2$ when exposed to light, either natural light or artificially generated light having wavelengths in the range of, generally, 400-680 nanometers. The sequestration of $CO_2$ into a photosynthetic reactor with elemental algae captures the carbon component, which the algae consumes for growth, while releasing free oxygen, which may be released into the atmosphere or recycled into the energy generation system to, for example, enhance combustion of bio-mass.

More particularly, photobioreactors ("PBR") are used to grow photosynthetic cell cultures and many factors influence the growth of cell cultures, such as light, carbon dioxide and other nutrients, and an understanding of the light requirements for microalgae is necessary. Efficient PBR design requires that light be provided at the required intensities, duration and wavelength based on pigments present in the microalgae. An excessive intensity may lead to photoinhibition and photooxidation, while low intensities may not promote algal growth. Essentially any type of light sources which produces light between 400-500 nm and 525 nm-680 nm should be able to support the growth of blue-green algae. The best way to achieve the required high concentration of photons of red light close to 680-700 nm is by using LEDs with peak wavelengths close to 680 nm. Since green algae have Chlorophyll a, Chlorophyll b, and β-carotene light-harvesting pigment are present, any light source which can produce wavelengths ranges of 400 nm to 500 nm and 620 nm to 680 nm should be able to support growth of algae with LEDs being able to provide the required photons with the least amount of energy expense. Temperature of medium also influences the light intensity requirements for optimal growth of blue-green and green algae, hence, light in the infra-red spectrum can be counterproductive, providing unwanted heat without any photosynthetic bonus. See, Kommareddy, A. et al., "Study of light requirements of a Photobioreactor," *An ASAE/CSAE Meeting Presentation Paper Number: MB*04-111, The Society for Engineering in Agricultural, Food, and Biological Systems (Winnipeg, Canada; Sep. 24-25, 2004)

Photobioreactors generally known in the art include cylindrical algal photobioreactors that can be categorized as either "bubble columns" or "air lift reactors." Bubble columns are typically translucent large diameter containers filled with algae suspended in liquid medium, in which gases are bubbled at the bottom of the container. Since no precisely defined flow lines are reproducibly formed, it can be difficult to control the mixing properties of the system which can lead to low mass transfer coefficients, poor photomodulation and low productivity. Air lift reactors typically comprise vertically oriented concentric tubular containers, in which the gases are bubbled at the bottom of the inner tube. The pressure gradient created at the bottom of this tube creates an annular liquid flow (upwards through the inner tube and downwards between the tubes.) The external tube is made of translucent material, while the inner tube is usually opaque. The algae are, therefore, exposed to light while passing between the tubes and to darkness while passing in the inner tube. The light-dark cycle is determined by the geometrical design of the reactor (e.g., height, tube diameters) and by operational parameters (e.g., gas flow rate.) Air lift reactors can have higher mass transfer coefficients and algal productivity when compared to bubble columns. The growth of the algae bloom provides harvestable algae, which can be dried and used as a bio-mass fuel, or if adequately purified, can be sold as bovine feedstock, or can better be utilized to produce bio-diesel fuels.

Photobioreactors useful in practicing the present invention are taught by Dunlop et al., U.S. Patent Application Publication No. 2008/0086939; and Berzin, U.S. Patent Application Publication No. 2005/0260553, the disclosures of which are hereby incorporated by reference herein. Berzin has also been published as P.C.T. Patent Application Publication No. WO 03/094598 A1; European Patent Application 1,509,076 A1; Canada Patent Application No. 2,488,443 A1; Australia Patent Application No. 2003234604 A1; and China Patent Application No. 1,668,185 A1.

In an alternative embodiment, municipal waste water, which has undergone primary treatment, may be introduced into the algae pond. The intermixture of primary treated wastewater into algae ponds can provide secondary treatment, which can produce water of industrial quality. While some of this treated industrial quality water may be utilized within the steam plant's generation system as make-up fluid, it is environmentally susceptible of other wastewater uses and can provide a source of the fluid utilized as a component in the algae processing tank. There are other known prior art methods for removing carbon dioxide from the flue gases, including membrane technology and soda lime chemistry.

There are also proprietary methods for the reduction of $CO_2$ in stack gases which can also produce refrigeration and/or electric power. Refrigeration can provide liquefied $CO_2$, which is a marketable commodity.

It is an object and an advantage of the present invention to use the aforementioned features and processes set forth above, and the establishment of the equipment and the utilization thereof, for generating and transmitting electric power, e.g., the establishment of the business method for the creation and operation of a plant for generating and transmitting power. The general features of this business include the establishment of generation facilities to generate power from wind, solar and bio-mass (also likely including geothermal sources and possibly others) interconnected in a unique and integrated manner.

The mere collection of the individual facilities to produce power from wind, solar, and bio-mass would by themselves appear to be an aggregation. i.e., they could indeed be used in such a fashion to provide independent outputs from each source individually. However, the present invention, as herein disclosed, contemplates much more than the mere aggregation of three sources producing three lines of independent power. Rather, the integration of at least these three sources is both symbiotic and synergistic. More particularly, it is this combination and interaction between the (at least) three sources, and their synergistic relationship, which has the enhanced advantage of allowing the operator to always select the least-cost fuel source of power to be placed on the transmission grid. It is the synergistic and symbiotic relationship between wind power, on the one hand, and solar power, on the other hand, and the symbiotic and synergistic relationship between wind and solar along with the bio-mass energy generation system.

If one were to write the operations in the manner of a vector analysis, where:
"A"=wind power;
"B"=solar power; and,
"C"=bio-mass power,
the expressions might be as follows:

$$A/B \neq A+B; B/C \neq B+C, \text{etc.}$$

$$A \cdot B > A+B$$

$$A \times B > A \cdot B$$

likewise, $$B \times C > B \cdot C$$

$$A \times C > A \cdot C$$

and, $$A \times B \times C > A+B+C, \text{ or } A \cdot B \cdot C$$

From the three initially autonomous sources, A, B and C, there are at least seven combinations, A, AB, B, BC, C, CA, and ABC. The above equations are intended merely as expressions of the symbiotic and synergistic relationship of the three primary sources (there could be more than three primaries) as they work in harmony, under the control of the system operator, and applied algorithms, to produce electrical power from various alternative or renewable resources as a method of running a business as a power generating and transmitting facility, while supplying such energy at a least-cost basis.

The various apparatuses and methods by which they operate, in the integrated energy production plant and transmission system, as described in detail below, comprise a new method for running a power generating company, which uses only renewable energy resources providing baseload electrical power on a "least-cost" basis. Examples of the symbiosis include that the wind generator source may variously share its power with both the transmission grid and with the bio-mass energy generation means. Similarly, the solar thermal facility interacts with the bio-mass generator, sometimes in partnership with the wind source, to contribute to bio-mass energy generation.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawings, wherein similar reference numerals and symbols denote similar features throughout the several views:

FIG. 9 illustrates various features of the bio-mass logistics system;

FIG. 9a illustrates the configuration of the bio-mass bio-cell containers;

FIG. 9b illustrates the transportation system for the bio-cell containers and the utilization of the same transportation system for logging operations;

FIG. 10 illustrates further features of the bio-mass logistics system;

FIG. 10a illustrates the logistics of the transportation to, and from, the plant and/or forest of the bio-cell containers; and, FIG. 10b illustrates the in plant bio-cell container inventory and cell logistics system.

DETAILED DESCRIPTION OF THE DRAWING FIGURES AND PREFERRED EMBODIMENTS

Figure 1:
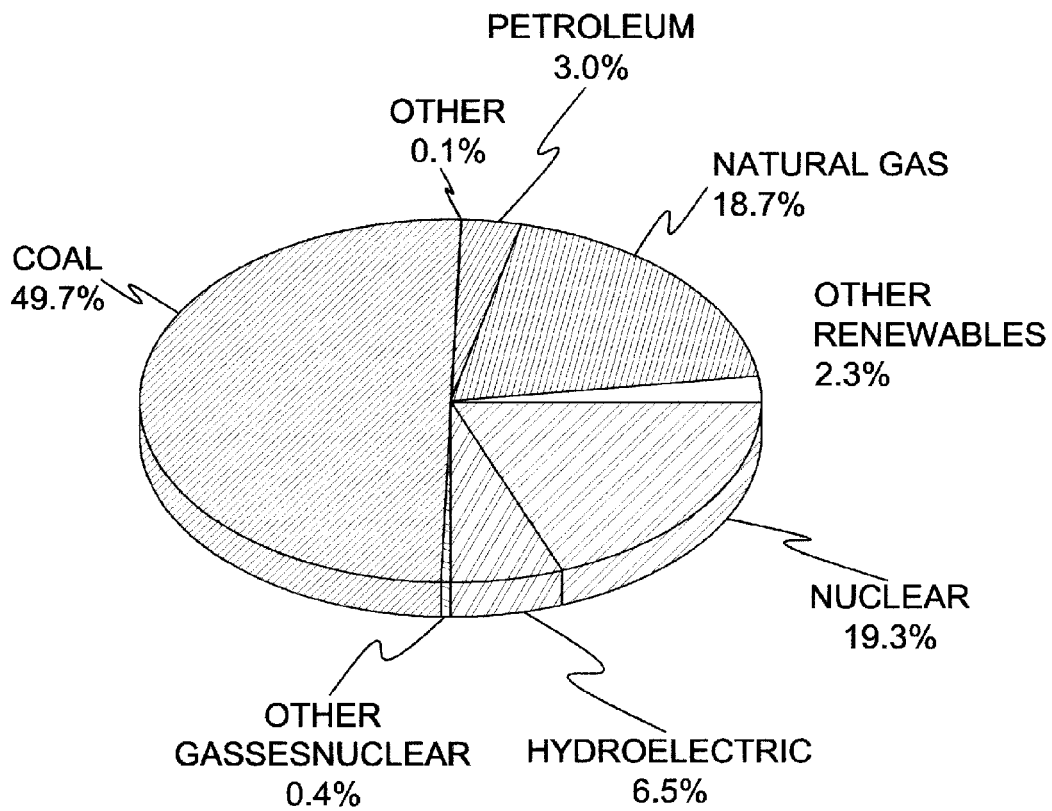
FIG. 1 is a diagrammatic graphical representation of the state of the electricity market in the United States for the year 2005 derived from the United States Energy Information Administration, as described in the Background of the Invention.
Figure 2:
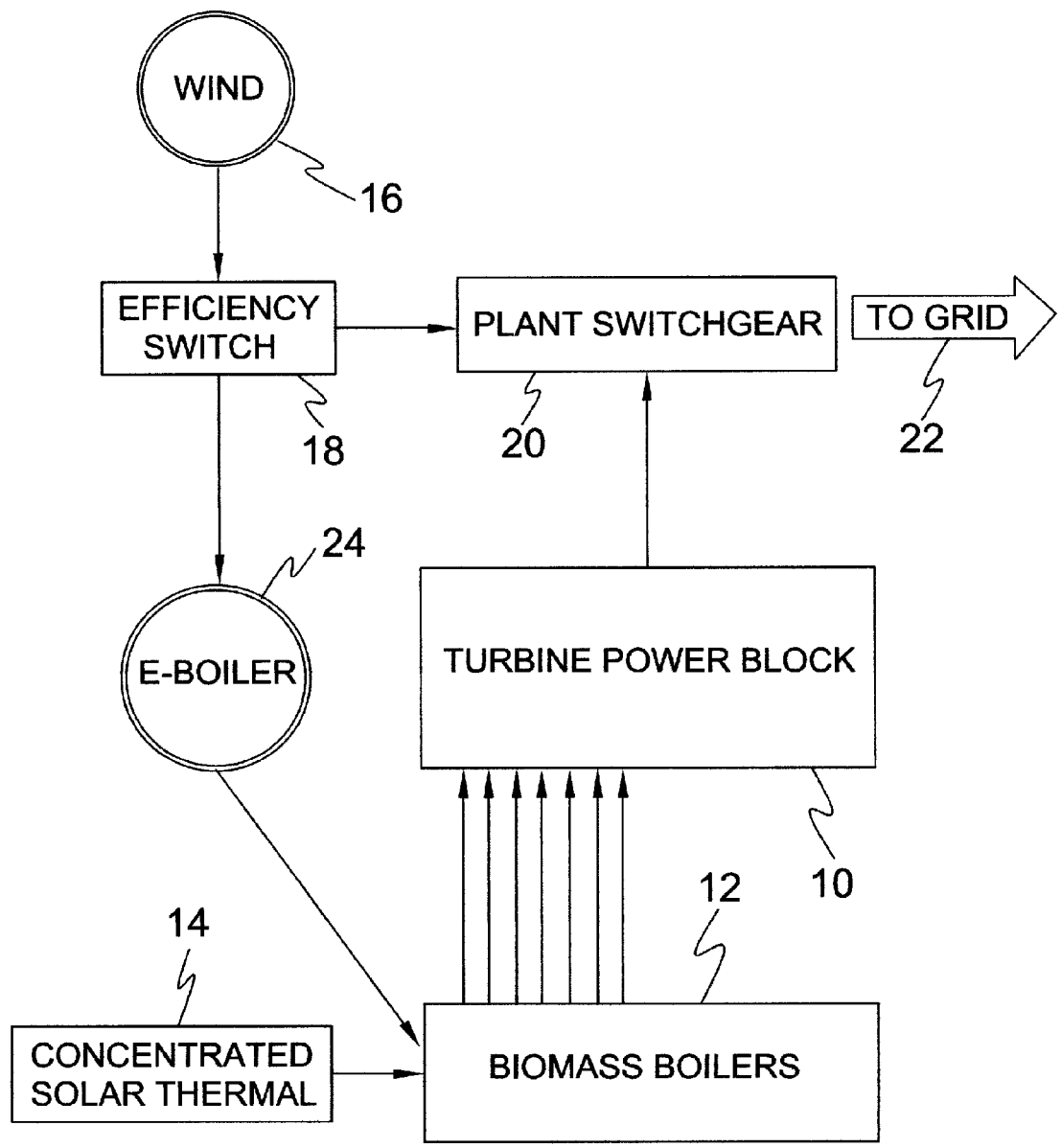
FIG. 2 is a flow chart illustrating the basic operations of the present invention.

Turning now, in detail, to an analysis of the drawing figures, FIG. 2 illustrates the basic elements of the energy system of the present invention. Central to the inventive system is the turbine power block 10, which is primarily comprised of conventional steam driven turbines driving electric generators. The energy that drives the turbine power block may be derived from three sources: the bio-mass boiler system 12, the solar thermal system 14 and the wind system 16.

The solar thermal source 14 is shown feeding its energy directly into the bio-mass boilers 12. The wind energy system 16 is shown having alternatives for switching its energy output. Wind energy from source 16 is first conducted to an efficiency sensing switch module 18, which determines the efficacy of the quality of the electric signal being generated by wind source 16. If the value or quality of the electric signal coming from wind source 16 is compliant with the requirements of the transmission grid, the plant switch gear 20 will direct power from the wind source 16 to the transmission grid 22. If efficiency switch 18 senses that the signal from wind source 16 is not appropriate for transmission to the grid, efficiency switch 18 switches the output of wind source 16 to electric boiler 24. Electric boiler 24 utilizes the electric energy directed to it from efficiency switch 18 to provide pre-heat energy by way of resistive heating elements, which supplies heat in the bio-mass boiler 12, thereby tending to reduce needed consumption of other energy sources to produce steam.

As should be apparent from FIG. 2, the three sources of energy—bio-mass, solar and wind—can be selectively combined to provide energy from the boilers 12 to power the turbines 10. Depending upon the strength of the electrical signal from wind source 16 and/or the amount of energy derived from the solar thermal source 14, the amount of bio-mass required in boiler 12 can be adjusted over a wide range to provide a continuous output to turbine 10. Hence, the generation system can provide basic power, utilizing the least-cost fuel source, whether it be wind or solar, and adjust downwardly the amount of bio-mass required to provide the basic amount of steam energy to drive the turbines to provide constant dispatchable power. Likewise, it will be apparent from FIG. 2, that under demand situations requiring increased output, all three sources, i.e., wind, solar and bio-mass, can be employed selectively and/or simultaneously to provide increased or peak output, as will be more fully described hereinafter.

Figure 3:
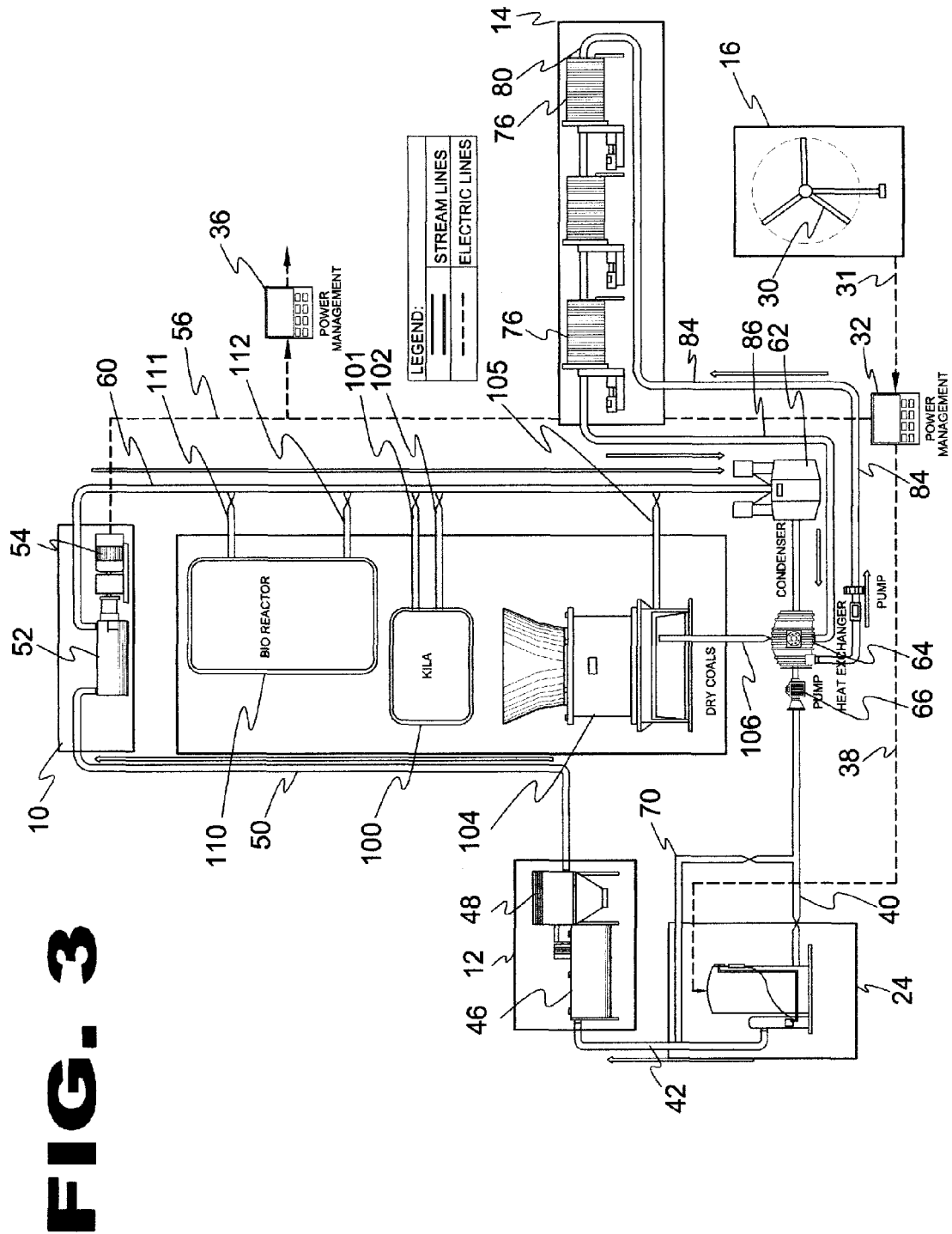
FIG. 3 is a diagram of the basic features of the power plant of the present invention, illustrating the interconnection of the three basic elements of the integrated energy system.

FIG. 3 details of the system diagrammed in FIG. 2. A windmill illustrated at 30 would, of course, include a generator connected to produce electric power. Windmill 30 is shown electrically connected by line 31 to a power management module 32 (which is effectively the efficiency switch 18 of FIG. 2.) Power management module 32 detects the voltage level and frequency of the electrical signal output on line 31. If the electrical signal on line 31 is the appropriate frequency and voltage level for acceptance by the transmission grid system, power management module 32 will switch the output of the windmill onto conductor 33, which conducts the electric signal through a second power module 36 to output the energy from windmill 30 to the transmission grid. If the frequency, voltage level or other aspects of the signal on line 31 is unacceptable for output to the grid, power management module 32 will switch the output of windmill 30 on to line 38, which delivers the electric signal to electric boiler 24. Electric boiler 24 is supplied with water through pipeline 40. Heated water from boiler 24 is fed through pipeline 42 to a bio-mass boiler system 12, which comprises a bio-mass furnace 46 and steam boiler 48. Steam from boiler 48 running at about 2,300° F. is transmitted through pipeline 50 to steam turbine 52 in the turbine power block 10. Steam turbine 52 provides drive shaft energy to generator 54, the output of which provides an electrical signal on conductor 56, which is directed to power management module 36, which can selectively output the electric signal to the grid. Spent steam exiting turbine 52 is returned through pipeline 60 to condenser 62 to reduce the remaining steam and water vapor to liquid water. Fluids condensed in condenser 62 are then directed through heat exchanger 64 and pump 66 to selectively direct fluid either through pipeline 40 to electric boiler 24 or directly through pipeline 70 to the bio-mass furnace and steam generator 46, 48, or to the solar thermal energy system 14.

The solar thermal energy system, generally designated by numeral 14, includes a plurality of solar collectors 76, which focus concentrated solar energy upon fluid in pipeline 80 which conducts fluid through the solar collectors 76. A quantity of cooled fluid is obtained from heat exchanger 64, to conduct cooler water through pipeline 84 to the solar thermal system 14. Superheated water passing from the solar collectors 76 is conducted through pipeline 86 through heat exchanger 64, which, in turn, conducts superheated water through pipeline 70 to boiler 46 in boiler system 12. This pre-heat capability effectively reduces fuel consumption requirements of the bio-mass generators; in fact estimates are that during at least peak sunlight hours, this solar pre-heat can reduce bio-mass fuel requirements by as much as 80%.

Spent steam returning from the steam turbine 52 through pipeline 60 may be provided with a number of drop-off points in line 60 for the utilization of some of the residual heat not consumed by turbine 52. Fresh bio-mass will typically have a considerable amount of latent water, which must be removed prior to introduction into furnace 46. For the purpose of removal of this water content, a kiln is provided at 100 into which moist bio-mass may be deposited. Alternatively, heat of decomposure and associated reduction of the bio-mass can provide usable fluids and leached wood sugars. Heat from the residual steam in line 60 may then be fed to kiln 100 through pipeline 101 to provide heat to drive off water vapor. Water vapor extracted from kiln 100 may be collected and returned together with fluid flowing through the kiln through pipeline 102 to return line 60. In an alternative embodiment, fluids extracted from forestry products stored in the bio-cell containers may include leached bio-gas producible contents in the form of wood sugars, and these fluids would be conducted offline to another location for further treatment; such as for the production of other fuels, including methanol or ethanol.

A dry cooler 104 is also provided to further process bio-mass, heated by steam in return pipeline 60 through pipeline 105 and any residual fluid obtained therefrom may be conducted through line 106 to heat exchanger 64. The means of delivering treated bio-mass from the kiln 100 or the dry cooler 104 is not depicted in FIG. 3.

FIG. 3 further depicts a bio-reactor 110, which is coupled to return pipeline 60, at 111 and 112, to provide heat to the bio-reactor. Further details of the bio-reactor system will be set forth hereinafter. This bio-reactor may be used to treat flue gasses and/or alternatively treat leached fluids from the bio-mass, or bio-cell, containers.

Thus, it will be seen that the amount of bio-mass consumed in furnace 46 can be materially reduced by the input of superheated water from the solar thermal source 14 and/or the redirection of non-optimal power from the wind source 16 by power management module 32, which provides at least two sources of preheat to the furnace at 46 through electrical boiler 24 and/or boiler 48.

Figure 4:
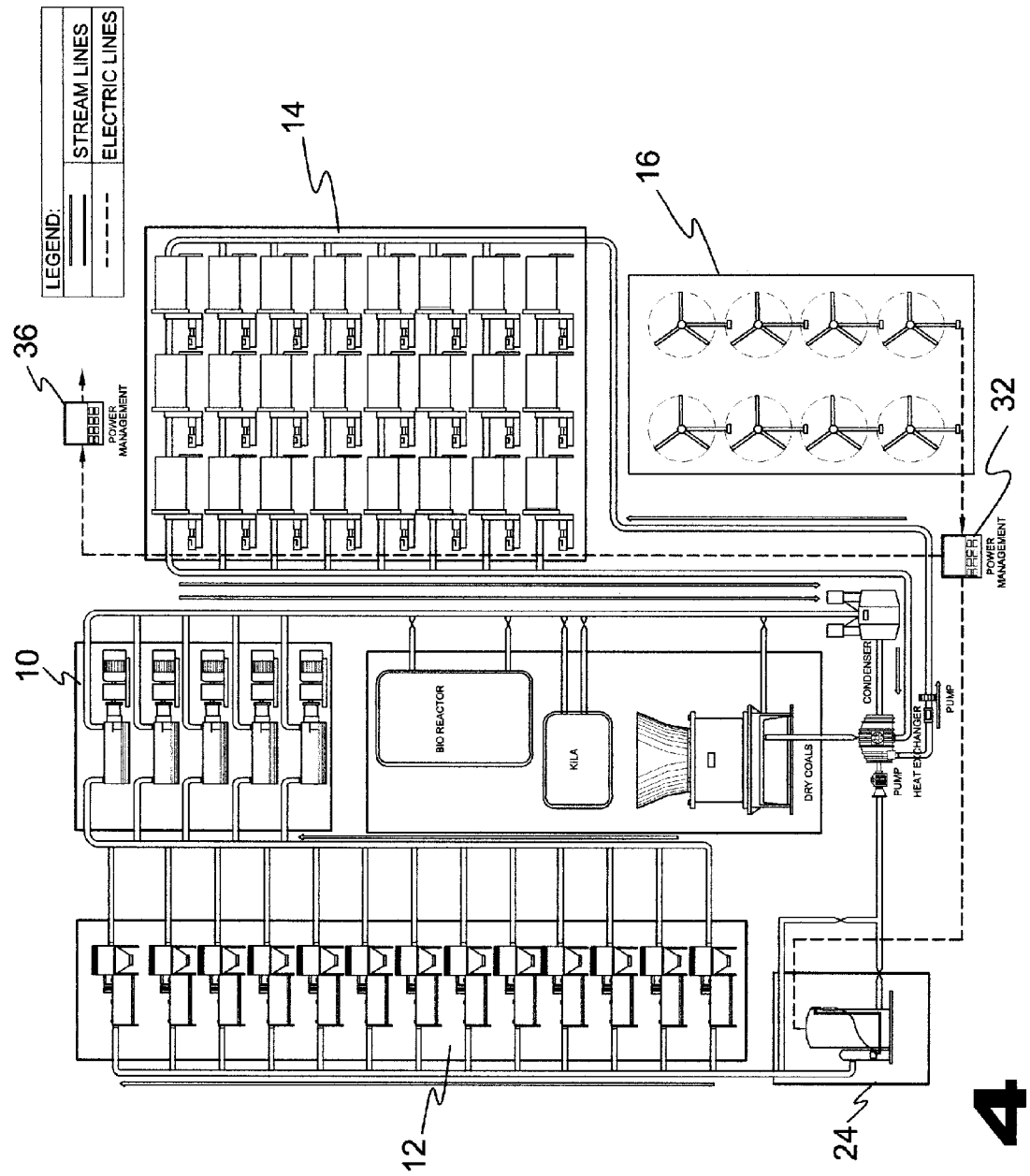
FIG. 4 is a diagrammatic representation of the power plant illustrating the inter-connection of multiples of the three basic elements of the integrated system.

FIG. 4 depicts a more complete, integrated power plant, which replicates the elements of FIG. 3, in that it adds multiple units in wind system 16, solar unit 14 and bio-mass boiler system 12. Multiple steam turbines in block 10 are also provided. By way of example, wind powered generators capable of producing 2.5 MW at wind speeds in excess of 20 mph are commercially available. Clipper Windpower, Inc., located in Carpinteria, Calif. is one commercial source of such wind generators. FIG. 4 shows eight such wind generators, capable of producing 20 MW of aggregated power at rated wind speeds. As more completely set forth in the description of FIG. 3, wind speeds below the cut-in (nom.<10 mph) cause the power management module 32 to switch the output from the wind generators to resistive heaters in electric boiler 24. This can provide extra power at about 1,300 volts, resulting in an increase in the efficient use of wind power by approximately 30% and a concomitant decrease in bio-mass fuel supply requirements.

The solar thermal section 14 in FIG. 4 utilizes a plurality of parabolic troughs, which heat water in the fluid streams to approximately 1,000° F. Typical solar thermal systems using a power block to convert thermal energy to electric energy typically use approximately 60 MW of solar energy to produce 20 to 25 MW of electric power. Instead, the present invention's utilization of solar heated water as preheat to the boilers 48 results in a reduction in the requirement of bio-mass in the furnaces by as much as 50% to 90% when solar energy is available. The present invention's utilization of solar heat for the boilers precludes the huge Newtonian conversion losses practiced in the prior art in converting heated fluids to electrical energy by power blocks.

The bio-mass boiler section 12 in FIG. 4 depicts approximately 14 furnace/boiler combinations. Such elements are typically capable of producing approximately 3 to 19 MW of power each and running at about 2,300° F. will oxidize most volatiles and bio-mass waste products, yielding fly ash with a not inconsiderable carbon content in the flue gas. During periods when either solar or wind is available, or both, the bio-mass boilers can be throttled back as much as 10 to 1. The bio-mass boilers are, of course, the prime-mover of the power generating system, operating on a 24/7 basis. As previously mentioned it is contemplated that the bio-mass furnaces utilize wood chips, wood waste products, and/or bovine waste.

The invention further contemplates the utilization of geothermal sources of power, where geographically suited to plant location. Geothermal power typically uses hot fluids heated by subterranean sources and heat exchangers to extract the heat. Such geothermal heat can be utilized much like the solar thermal heat is used as a preheat to the bio-mass boilers. Hence, it is equally contemplated to utilize geothermal power as a fourth, or an alternative, source of renewable thermal energy. As with the proposed use of solar thermal energy, the present invention utilizes the thermal energy directly instead of converting it to electric energy, thus obviating the conversion losses.

Figure 5:
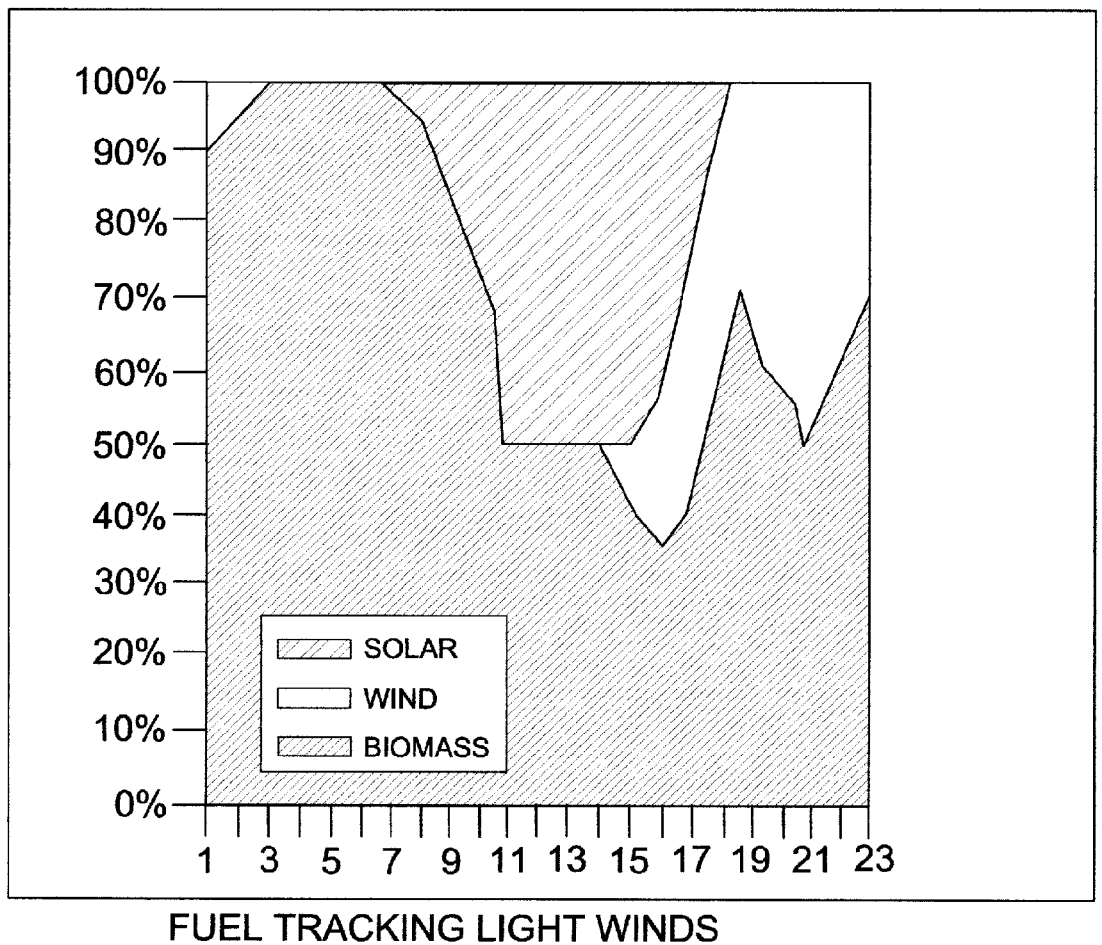
FIGS. 5, 6 and 7 are graphical representations tracking the use of the various fuel sources under varying climatic and atmospheric conditions.
Figure 6:
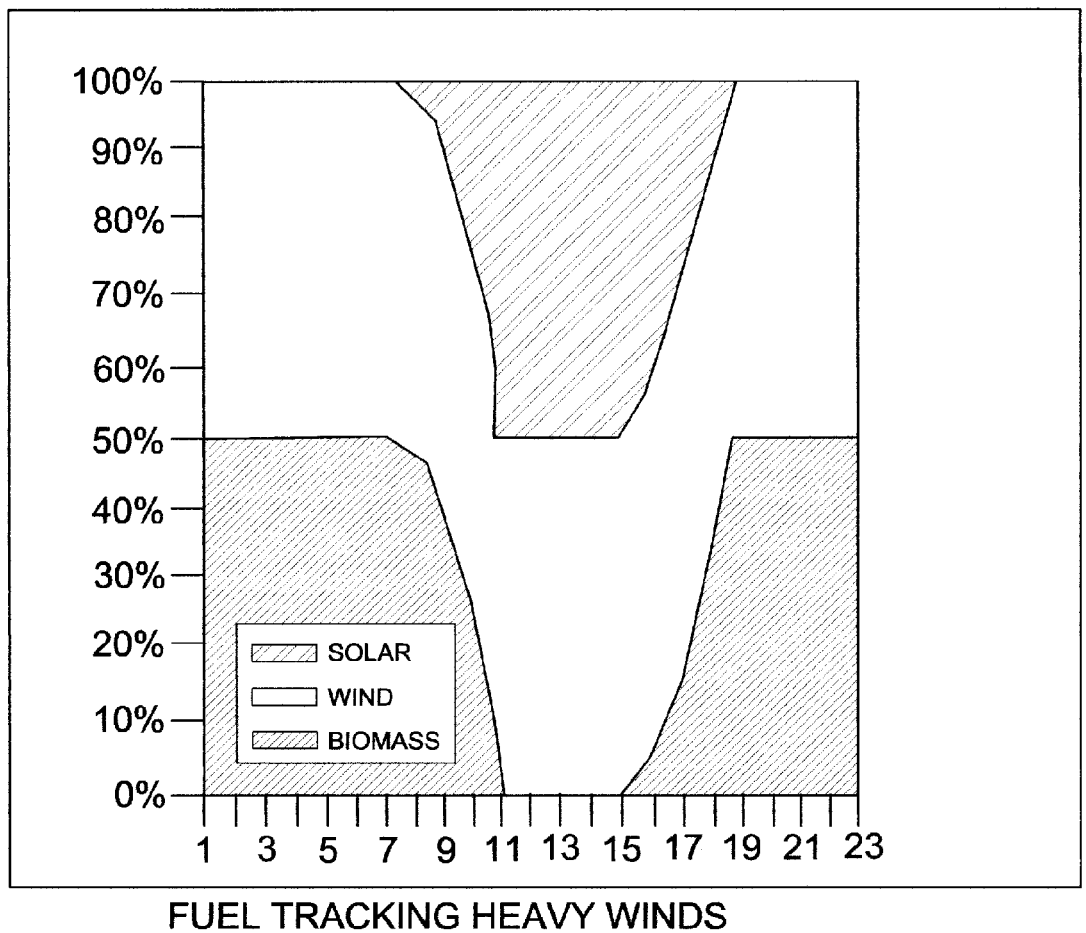

FIGS. 5 and 6 are graphical representations of fuel tracking on a 24 hour/day basis of the participation of the composite sources of the integrated power plant during different climatic conditions. FIG. 5 tracks fuel utilization during periods of light winds. Solar energy, as graphically shown, illustrates the presence of solar energy during daylight hours from typically 6 a.m. until approximately 6 p.m. Also graphically illustrated in FIG. 5 are examples of intermittent wind availabilities, which provide scattered amounts of wind power throughout different parts of a day. The remainder of the power output of the integrated energy production plant and transmission system is graphically illustrated for showing which power will be provided by the combustion of bio-mass.

In contrast, FIG. 6 depicts fuel tracking during periods of heavy winds. FIG. 6 exhibits the same presence of solar from 6 a.m. to 6 p.m., however, wind power graphically shown in FIG. 6 augments a significant portion of the power of the integrated energy production plant, generally, during morning and evening hours, in an obverse relationship with the contributions from solar energy availability. On such days, the utilization of bio-mass, as graphically shown in FIG. 6, is substantially diminished.

Figure 7:
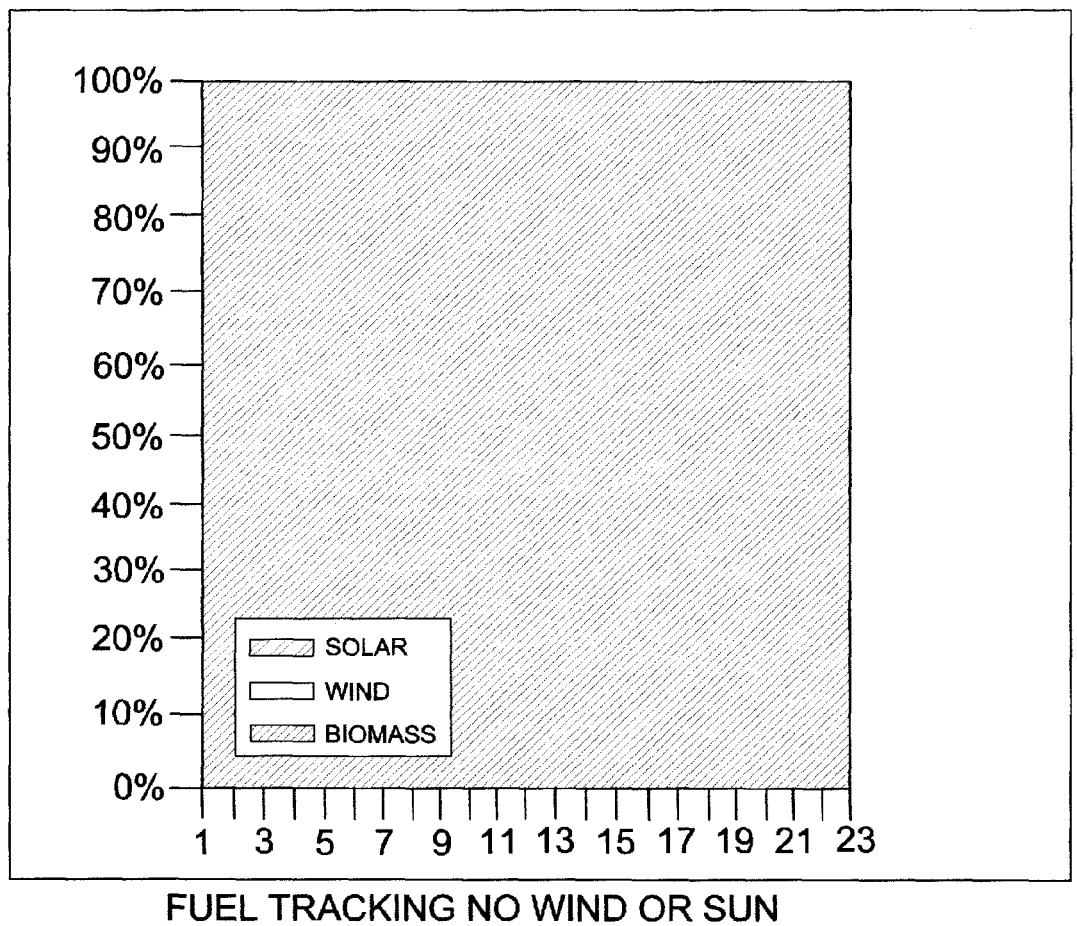

FIG. 7 demonstrates the operation of the plant, tracking fuels when there is neither wind nor sunshine. Thus, there is no solar component or a wind component in FIG. 7 and the entirety of the electrical energy output of the plant is the result of the combustion of bio-mass.

Figure 8:
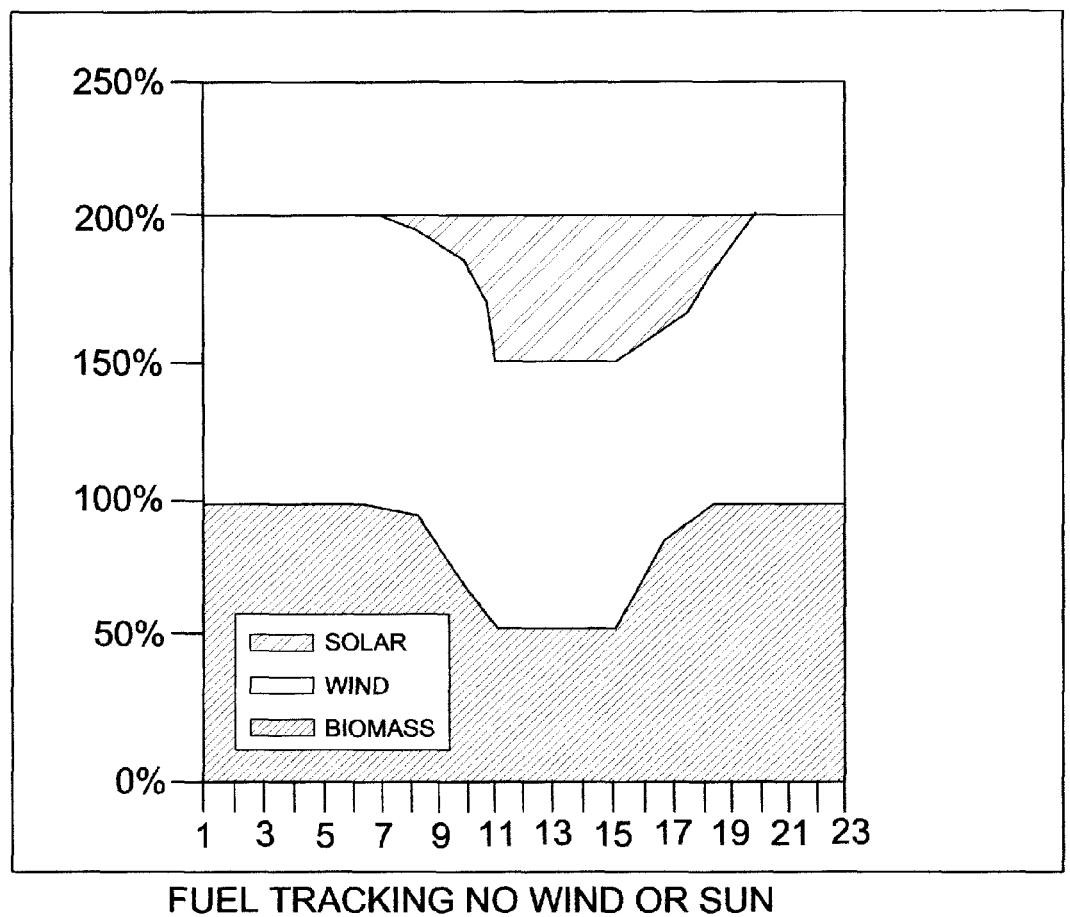
FIG. 8 is a graphical representation of the integrated energy production plant and transmission system, illustrating the utilization of all fuel sources, providing peak output.

FIG. 8 is a graphical representation of fuel tracking for the power plant when called upon to produce peak power output, particularly under conditions where both wind and solar are available. This graph indicates how the application of solar thermal, as a preheat mechanism for the bio-mass furnaces, correspondingly diminishes the requirement for the combustion of bio-mass during sunlight hours. Peak outputs of 200 to 250% are possible using all three fuel sources even though the utilization of bio-mass may be diminished as a requirement under conditions where full solar thermal is available as a preheat source and wind power is constantly available to provide additional power as indicated.

FIGS. 9 and 10 display the features of the bio-mass logistics and inventory systems, which are an integral part of the present invention. It is considered a significant feature of the present invention to have sufficient redundancy in the supply of bio-mass materials, so that under conditions where neither solar nor wind is available and/or when peak power is demanded, there will be no shortage of fuel.

It is another feature of the present invention to provide an efficient bio-mass handling system, which minimizes handling of bio-mass products from the point of harvest to the point of combustion. It is viewed as a shortcoming of many prior bio-mass fueled alternative power generation systems that they fail to provide efficient handling of their bio-mass fuel, particularly with regard to redundancy of supply and efficient inventory controls. The present invention contemplates a modular design of bio-cell containers of standardized (or uniform) shape, size and construction for continuously harvesting fuel in a forest or at a livestock feedlot, an integrated system for the transport of filled and emptied bio-cell containers, the storage and handling of those bio-cell containers at the power plant and an efficient system for inventory control.

In FIG. 9a, a wood waste and pole harvester-chipper 120 efficiently gathers sub-optimal forestry assets and other forestry waste products and cuts smaller timber poles and feeds them to a chipper. The flatbed 121 of harvester vehicle 120 provides a rotating platform, which can swap empty bio-cell containers 130 with filled ones 131 by rotating the platform situated on flatbed 121. The bio-cell container units 130 are standardized containers, capable of holding chipped and other waste forestry products of a quantity equivalent to approximately 12 MW of energy each. A bio-cell forwarding truck 140 delivers empty bio-cells 130 to the harvester-chipper 120 and takes away filled bio-cells 131. It is contemplated that the forest forwarding truck 140 would deliver and take away filled and/or empty bio-cells containers to an on-road truck 150 or rail car capable of carrying a greater quantity of bio-cells. It is equally contemplated that on-road truck 150 may be equipped with appropriate side rail equipment so as to contain logs for the harvesting of timber from the forestry site. By the same token, the forest forwarding truck 140 may also be provided with appropriate side railing equipment to handle logs as shown in FIG. 9b.

FIG. 10, specifically FIG. 10a, depicts delivery from the on-road truck 150 to the integrated energy production power plant, the unloading of filled bio-cell containers and the reloading of empty bio-cell containers to return the empty bio-cells to the forestry site. It is equally contemplated that following the off-loading from the trucks, filled and empty bio-cells can be handled at the integrated energy production plant by rail systems.

FIG. 10b presents a diagram of a bio-cell inventory and control system. On the right-hand side of FIG. 10b is depicted an arrangement of full bio-cells 131 as they are offloaded from trucks 150 and stored in an inventory system, as shown by the accumulation of the bio-cells 131. Each of the bio-cells is inventoried on a network of tracks 160, and when bio-mass is needed at one or more of the furnaces, a full bio-cell container 131 is moved along the tracks 160, 161 to the appropriate furnace needing fuel. After the contents of the mobile cell is dumped into the furnace, the empty bio-cell container is moved along track 162 to the empty cell inventory area 170. The empty cells 130, stored in the empty inventory, can then be led along exit tracks 164 to a siding, where they can be loaded onto railcars and/or trucks for transport back to the harvesting area.

It will be readily appreciated that the bio-mass harvesting and logistics systems, as illustrated in FIGS. 9 and 10, vastly reduce the handling of bio-mass material to a single-stage handling system from the point of harvest to the point of combustion. The extensive inventory system of bio-cell containers makes it possible to provide adequate redundancy of fuel for the bio-mass boilers in anticipation of any demand peaks. Further, the bio-cell logistics and inventory system vastly reduces labor in the handling of bio-mass material and enhances its storage, as well as its availability, on a "just in time" basis for fueling the bio-cell furnaces.

While only several embodiments of the present invention have been shown and described, it will be obvious to those skilled in the art that many modifications may be made to the present invention without departing from the spirit and scope thereof.

What is claimed is:

1. A system for continuously generating baseload electrical energy and transmitting the generated electrical energy to a transmission grid, comprising:
   a primary generator for continuously generating a primary energy output, said primary generator operable on a continuous non-intermittent basis, said primary generator having a primary fuel supply comprising a single form of fuel derived exclusively from renewable resources, said primary fuel capable of enabling continuous operation of said primary generator using only said primary fuel, and means for continuously supplying said primary fuel for generating said primary output continuously;
   a secondary generator providing a secondary output, said secondary generator having a fuel supply derived exclusively from renewable resources, said secondary output providing as available electrical and thermal energy for substituting and supplementing the electrical energy output of said primary generator, and supplying as available a second form of fuel for supplementing the supply requirement of said primary fuel for said primary generator;
   switch means coupled to said primary and said secondary generators and to said transmission grid for enabling the continuous generation and delivery of electric energy at baseload levels, the operation of said switch means configured to optimally reduce the consumption of said primary fuel in said primary generator in favor of the application to the system of the output of said secondary generator, the combination thereby yielding at minimum a continuous total electric energy output at baseload level; and,
   means coupling said total electrical energy output to the transmission grid.

2. The system for generating electrical energy and transmitting the generated electrical energy to a transmission grid according to claim 1, wherein
   said switch means comprises means for providing a least-cost generation of baseload electrical energy by said system by selectively switching between the electrical energy output of the primary generator and the as available, energy of the secondary generator substituting for and supplementing the electrical energy output of said primary generator, and selectively switching the as available energy of the secondary generator for supplementing the supply requirement of said primary fuel, thereby yielding a combination providing, at a minimum, baseload electrical energy comprising a total electrical energy output.

3. The system for generating electrical energy and transmitting the generated electrical energy to a transmission grid according to claim 1, wherein said primary fuel is comprised of bio-mass selected from the group consisting of woody biomass, bovine waste, dewatered algae and a combination thereof.

4. The system for generating electrical energy and transmitting the generated electrical energy to a transmission grid according to claim 1, wherein said secondary fuel supply is derived from wind resources.

5. The system for generating electrical energy and transmitting the generated electrical energy to a transmission grid according to claim 1, wherein said secondary fuel supply is derived from solar resources.

6. The system for generating electrical energy and transmitting the generated electrical energy to a transmission grid according to claim 1, wherein said secondary generator comprises:
   a first additional renewable-based energy generation means for generating a secondary electrical energy output for substituting and supplementing, as available, the electrical energy of the primary output of said primary generator and for supplementing the supply requirement of said primary fuel; and, a second additional renewable-based energy generation means for generating thermal energy for supplementing, as available, the supply requirement of said primary fuel.

7. The system for generating electrical energy and transmitting the generated electrical energy to a transmission grid according to claim 6, wherein said first additional renewable-based energy generation means for generating said secondary output is a wind-propelled generator.

8. The system for generating electrical energy and transmitting the generated electrical energy to a transmission grid according to claim 6, wherein said second additional renewable-based energy generation means for generating said secondary output is a solar thermal generator.

9. The system for generating electrical energy and transmitting the generated electrical energy to a transmission grid according to claim 6, wherein:
said first additional renewable-based energy generation means for generating said secondary output is a wind-propelled generator; and,
said second additional renewable-based energy generation means for generating thermal energy for supplementing as available the fuel supply requirement of the first energy generation means is selected from the group consisting of a solar generator, and a combination of a solar generator and a wind-propelled generator.

10. The system for generating electrical energy and transmitting the generated electrical energy to a transmission grid according to claim 1, further comprising:
a bio-mass logistics system including:
forestry asset harvesting apparatus having means for identifying sub-optimal forestry assets and harvesting the sub-optimal forestry assets at a forestry site, said forestry asset harvesting apparatus including:
forestry thinning means for cutting and handling the sub-optimal forestry assets;
means for gathering the sub-optimal forestry assets harvested using said forestry thinning apparatus; and,
means for gathering forestry waste created as a by-product of forestry lumber gathering operations and of natural causes at the forestry site utilizing said forestry thinning means for cutting and handling forestry assets;
chipping means for reducing into particle size the sub-optimal forestry assets gathered by said means for gathering the forestry waste;
a plurality of bio-cell units coupled to said chipping means for receiving the forestry waste reduced to said particle size, each bio-cell unit of said plurality of bio-cell units being transportable;
means for decoupling said plurality of bio-cell units from said chipping means after each of said bio-cell units has received the forestry waste of said particle size; and,
means for transporting said bio-cells;
a warehouse having an inventory logistics system for receiving said plurality of bio-cell units containing the forestry waste of said particle size, said warehouse being proximate to said first energy generation means, and said logistics system being capable of selectively delivering each said bio-cell unit containing the forestry waste of said particle size to said first energy generation means;
means for emptying said plurality of bio-cell units of the forestry waste of said particle size into said first energy generation means; and,
means for transporting to, and from, the forestry site said plurality of bio-cell units.

11. The system for generating electrical energy and transmitting the generated electrical energy to a transmission grid according to claim 1, further comprising:
means for capturing effluent gases of combustion of carbon-based fuel in said first energy generation means;
means for removing latent heat from the effluent gases;
means for recycling the latent heat to said first energy generation means;
a body of fluid containing micro-algal bodies;
means for delivering the effluent gases to said body of fluid containing said micro-algal bodies;
a light emitting source for emitting light having a wavelength for causing photo-synthesis by said micro-algal bodies in the presence of carbon dioxide;
means for circulating the effluent gases and said body of fluid containing said micro-algal bodies for exposing the effluent gases and said body of fluid containing said micro-algal bodies to said light emitting source for causing by photosynthesis of said micro-algal bodies production of an increased mass of algal bodies;
means for removing said increased mass of algal bodies from said body of fluid; and,
means for dewatering said increased mass of algal bodies following removal from said body of fluid.

12. The system for generating electrical energy and transmitting the generated electrical energy to a transmission grid according to claim 11, wherein said wavelength of said light emitting source for causing photosynthesis by said micro-algal bodies is in the range of 400-680 nm.

13. The system for generating electrical energy and transmitting the generated electrical energy to a transmission grid according to claim 11, wherein said micro-algal bodies include at least one species selected from the group consisting of blue-green algae and green algae.

14. A method for generating baseload electrical energy and transmitting the generated electrical energy to a transmission grid, comprising the steps of:
generating a primary output of electrical energy using a first generator, said primary generator being operated continuously on a non-intermittent basis, supplying the fuel requirements of said primary generator using a single form of fuel derived exclusively from renewable resources, said primary fuel being supplied in a manner enabling continuous operation of said primary generator without using any fuel other than said primary fuel, thereby generating said baseload electrical energy continuously;
generating a secondary energy output utilizing exclusively renewable energy resources, said secondary generator comprising at least one of wind power and solar-thermal energy for providing electrical energy and thermal energy for supplementing, as available, the baseload electrical energy and the supply requirement of said primary form of fuel for said primary generator;
continuously selecting the least-cost generation of electrical energy by said primary and secondary generators by selectively using, as available, the secondary output of said secondary generator substituting and supplementing the electrical energy of said primary output and providing a secondary form of fuel supplementing the supply requirement of said primary fuel for said primary generator thereby providing, at a minimum, a total energy output yielding a continuous baseload electrical energy output; and,
coupling said total generated electrical energy output to a transmission grid.

15. The method for generating baseload electrical energy and transmitting the generated electrical energy to a transmission grid according to claim 14, wherein said primary generator uses a primary fuel derived exclusively from renewable resources, including bio-mass selected from the group consisting of woody biomass, bovine waste, dewatered algae and a combination thereof.

16. The method for generating baseload electrical energy and transmitting the generated electrical energy to a transmission grid according to claim 14, further comprising the steps of:

generating secondary energy output in the form of thermal energy for supplementing as available the supply requirement of said primary fuel;

generating additional secondary energy output for supplementing, as available, the primary electrical output generated by said primary generator;

continuously selecting the least-cost generation of energy by said total generation system by selectively switching, as available, between the energy generated by said secondary generators and the primary output of said primary generator for substituting and supplementing the primary electrical output of said primary generator and, as available, switching the secondary energy output for supplying thermal energy to the primary generator for supplementing the primary fuel supply requirement of said primary generator, thereby providing, at a minimum, a total electrical energy output yielding baseload electrical energy.

17. The method for generating baseload electrical energy and transmitting the generated electrical energy to a transmission grid according to claim 16, wherein said secondary energy output is generated by a wind-propelled generator.

18. The method for generating baseload electrical energy and transmitting the generated electrical energy to a transmission grid according to claim 16, wherein said secondary energy output is generated by a solar thermal generator.

19. The method for generating electrical energy and transmitting the generated electrical energy to a transmission grid according to claim 14, further comprising the steps of:

providing a redundant supply of fuel for generating continuous baseload energy including the sub-steps of:

identifying sub-optimal forestry assets;

harvesting the sub-optimal forestry assets at a forestry site, said harvesting including the sub-steps of:

forestry thinning by cutting and handling the sub-optimal forestry assets;

gathering the sub-optimal forestry assets harvested using said forestry thinning operations; and, gathering forestry waste created as a by-product of said harvesting and from natural causes at the forestry site;

reducing the sub-optimal forestry assets harvested into particle size via chipping means;

collecting the sub-optimal forestry assets reduced to said particle size in finite uniformly sized bio-cell containers;

transporting the bio-cell containers containing the sub-optimal forestry assets reduced to said particle size from the forestry site to a location proximate to said first generation means;

warehousing a plurality of said bio-cell containers containing the sub-optimal forestry assets reduced to said particle size;

providing an inventory and logistics system for said bio-cell containers containing the sub-optimal forestry assets reduced to said particle size;

selectively delivering, as needed, said bio-cell containers containing the sub-optimal forestry assets reduced to said particle size to a point of combustion of said generation means;

emptying said bio-cell containers containing the sub-optimal forestry assets reduced to said particle size into said generation means for generating said baseload electrical energy; and, inventorying and transporting emptied bio-cell containers back to the forestry site.

20. The method for generating electrical energy and transmitting the generated electrical energy to a transmission grid according to claim 14, further comprising the steps of:

sequestering effluent gases containing carbon dioxide from said generation means, said sequestering step including the sub-steps of:

capturing the effluent gases of combustion of carbon-based fuel from said generation means;

delivering the effluent gases into a body of fluid containing micro-algal bodies;

providing a light emitting source within said body of fluid containing said micro-algal bodies, said light-emitting source having a wavelength for causing photosynthesis of said micro-algal bodies in the presence of carbon dioxide;

circulating the effluent gases and said body of fluid containing said micro-algal bodies for exposing the effluent gases and said micro-algal bodies to said light emitting source for causing by photosynthesis of said micro-algal bodies production of an increased mass of algal bodies;

removing said increased mass of algal bodies from said body of fluid and, dewatering said increased mass of algal bodies following removal from said body of fluid.

21. A method for establishing and operating an integrated energy production plant and transmission system using exclusively renewable resources for producing, at minimum, a baseload energy output, comprising the steps of:

identifying a source of bio-mass, providing a redundant inventory of said bio-mass and establishing a logistics system for handling said bio-mass;

establishing a first generation system operable on a non-intermittent basis and including at least one steam driven turbine generator for producing a continuous energy output;

continuously delivering said bio-mass to said first generation system for combustion therein, the continuous delivery thereby capable of enabling continuous generation of energy without utilizing any other fuel source;

establishing a second generation system for generating an intermittent energy output;

establishing switching means for selectively managing the continuous energy output of the first generation system and the intermittent energy output of the second generation system for providing an integrated energy production system;

causing the switching means to provide a least-cost total energy output by selectively switching the continuous energy output of the first generation system and the, as available, intermittent energy output from the second generation system for providing a least-cost fuel source and yielding the least-cost total energy output, said switching means being operable for sensing the intermittent energy output from said second generation system for providing a firmed constant baseload output;

connecting said least-cost total energy output to a transmission grid;

collecting effluent gases containing carbon dioxide from the first generation system; and, sequestering the effluent gases in a collector tank containing fluid and micro-algal bodies for eliminating release of carbon-based gases into the atmosphere.

22. The method for establishing and operating an integrated energy production plant and transmission system using exclusively renewable resources according to claim 21, wherein said logistics system for handling said bio-mass includes the sub-steps of:
  providing a plurality of containers for receiving and transporting said bio-mass;
  filling said plurality of containers with said bio-mass harvested from the source;
  extracting latent fluids contained in said biomass from said plurality of containers for leaching the latent wood sugars from the biomass; and,
  producing alcohol from the latent fluids containing the latent wood sugars obtained via said extracting sub-step.

23. The method for establishing and operating an integrated energy production plant and transmission system using exclusively renewable resources according to claim 21, wherein said step of sequestering the effluent gases in a collector tank containing fluid and micro-algal bodies includes the sub-steps of:
  providing a light emitting source in the collector tank for triggering photo-synthesis of the micro-algal bodies and absorption of carbon dioxide for growing an increased mass of micro-algal bodies;
  separating the increased mass of micro-algal bodies from the fluid in the collector tank;
  producing bio-diesel fuel from the increased mass of micro-algal bodies obtained via said separating sub-step; and,
  collecting free oxygen as a by-product of the photosynthesis in the collector tank.

24. The method for establishing and operating an integrated energy production plant and transmission system using exclusively renewable resources according to claim 21, wherein said logistics system for handling said bio-mass includes the sub-steps of:
  identifying sub-optimal forestry assets at a forestry site;
  thinning the forestry site by harvesting and removing the sub-optimal forestry assets;
  harvesting and removing forestry wastes in addition to the sub-optimal forestry assets;
  reducing the sub-optimal forestry assets obtained via said thinning sub-step and the forestry wastes obtained via said harvesting and removing sub-step to particle size by running the sub-optimal forestry assets and the forestry wastes through a chipper for obtaining particle-sized forestry assets;
  providing a plurality of uniformly sized receiving containers;
  filling said plurality of uniformly sized receiving containers with the particle-sized forestry assets for yielding filled containers of the particle-sized forestry assets;
  transporting the filled containers of the particle-sized forestry assets to a warehouse facility located proximate to the first generation system;
  providing an inventory and handling system for storing the filled containers of the particle-sized forestry assets and for moving the filled containers within inventory in the warehouse facility;
  delivering the particle-sized forestry assets of the filled containers to, and emptying the particle-sized forestry assets into, the first generating system for combustion;
  transporting filled containers to, and from, the warehouse facility and the forestry site;
  transporting said plurality of uniformly sized receiving containers, when empty, to, and from, the warehouse facility and the forestry site.

25. The method for establishing and operating an integrated energy production plant and transmission system using exclusively renewable resources according to claim 21, wherein said intermittent energy output of said second generation system includes a first intermittent energy output that comprises both electrical energy generation and thermal energy generation, and a second intermittent energy output that is exclusively thermal energy generation.

* * * * *